UNITED STATES PATENT OFFICE.

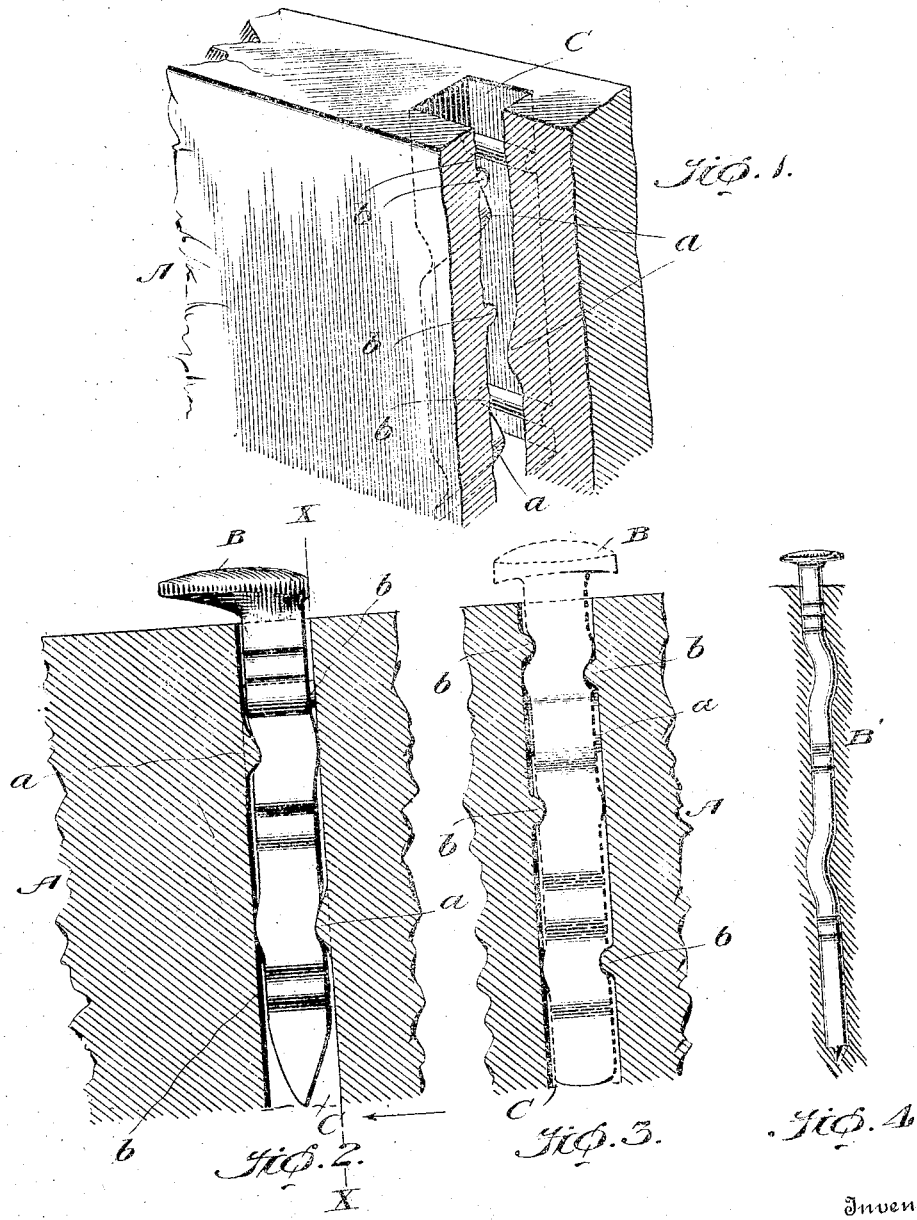

AUGUSTUS FREEBORN BROWN, OF HAVRE DE GRACE, MARYLAND, ASSIGNOR TO GORRELL STEEL SPIKE LOCK RAILROAD TIE CORPORATION, OF HAVRE DE GRACE, MARYLAND, A CORPORATION OF MARYLAND.

FASTENING MEANS.

1,127,176.  Specification of Letters Patent.  Patented Feb. 2, 1915.

Application filed August 28, 1914. Serial No. 859,042.

*To all whom it may concern:*

Be it known that I, AUGUSTUS F. BROWN, a citizen of the United States, residing at Havre de Grace, in the county of Harford and State of Maryland, have invented certain new and useful Improvements in Fastening Means, of which the following is specification.

My invention relates to a fastening means composed essentially of two co-acting parts, one having a spike or nail receiving socket or opening, certain of whose opposed walls are provided with integral curved ribs which project into the socket or recess and are arranged in staggered relation and are adapted to distort a substantially straight nail or spike driven into the socket or recess whereby said ribs impart to opposite walls of the spike or nail a sinuous formation; said socket or recess having other opposed walls formed integrally with projecting bosses which are substantially at right angles to the first-named ribs and which are also arranged in staggered relation and each of which is adapted to press into one side of the spike or nail to thereby displace the metal on the opposite side of said spike or nail and form a filler rib which seats against and transversely occupies the space between the second-named sides of the spike or nail and the contiguous corresponding walls of the socket or recess, whereby lateral vibration of the spike or nail is prevented and irregularities and variableness in forming the spike receiving opening is compensated for without the employment of separate filler pieces.

A leading object of my invention is to provide a simple means for engaging and distorting a nail, spike, or equivalent part when the same is being driven into a companion piece having a spike or nail receiving opening, or socket, whereby the nail or spike is converted from its normal substantially straight form into one that is of a wavy character on two opposite sides, said opening or socket of said companion part having, also, means for distorting the nail or spike on the remaining opposite sides, which are substantially at right angles to the first-mentioned sides which are given the wavy or sinuous formation, whereby the bosses or projections are formed on the second-named sides during the driving of the spike or nail and which bosses are adapted to fill the space between the walls of the opening or socket in which the nail is driven and the second-named sides of the spike or nail, whereby the bosses act as fillers and compensate for any irregularity or variableness in casting or forming the nail or spike receiving socket or opening and lateral vibration of the inserted spike or nail is prevented without requiring the use of shims, separate filler-pieces and the like.

A further object of the invention is to provide an article of the type mentioned which may be cheaply made and which will be found effective as a nail or spike-grip in attaching one piece to another.

With the above and other objects in view my invention consists of the improved nail fastening means which I will hereinafter describe and claim.

In the accompanying drawings forming part of this specification and in which similar reference characters indicate like parts in the several views;—Figure 1 is a sectional perspective view of a nail fastening element embodying my invention. Fig. 2 is a longitudinal sectional view showing an inserted and distorted spike in position. Fig. 3 is a cross sectional view on the line X—X of Fig. 1, showing the nail or spike in dotted lines. Fig. 4 is a modification to be referred to.

As the purpose of my invention is to provide a means whereby a nail, spike or equivalent part may be locked in place when driven into place in a part having an opening or socket especially prepared for it, it will be apparent that the invention will be found useful in various arts; it may, for instance, be used in building constructions for securing furring strips or metal lathing; it may also be employed in securing the sides of molds for concrete work and for false work in concrete construction. It will also be of especial advantage in the construction of railways as providing an effective means for securing a spike to a metallic tie where the said spike is commonly employed for securing the base flange of the ordinary rail to the tie. It will be understood therefore that my invention is of a more or less general application and that it is not limited in its use to any particular field.

In the accompanying drawings, the member, A, may represent any part into which is to be driven a nail or spike, B, which secures said member to a companion part, and which nail or spike may have any desired form in cross section. In Fig. 2 I illustrate a four-sided spike such as is commonly used for railway construction for securing the rail to the tie, but it will be understood that a spike or nail, B', of round or other cross section, (Fig. 4) may be used if the character of the work to which it is applied should make it desirable to do so. The spike or nail whatever its particular cross sectional shape, is normally substantially straight but in the driving of the same, the shape is designed to be simultaneously altered and certain of its opposite walls are designed to be given a serpentine or sinuous form whereby the now substantially zig-zag nail becomes locked in its recess or socket without the aid of other and supplemental fastenings. That this object may be attained, I fashion the part, A, with a spike receiving opening or socket, C, of a diameter which is slightly greater than the diameter of the nail or spike. Two opposite walls of the socket thus formed are provided with more or less curved or elongated ribs, a, which project into the socket from opposite directions, the ribs or projections on one wall alternating with those of the opposed wall to form substantially a tortuous passage, whereby when the nail or spike is driven into the socket it is successfully engaged by the projections or ribs, a, on opposite walls and said nail or spike is curved first in one direction and then in the other, because of the alternate arrangement of the ribs, said nail or spike being thus given a sinuous or wavy form, in the direction of its length. This construction affords bearing points of substantial area at different points in the length of the nail and also gives a positive or shoulder grip under the ribs by reason of the zig-zag course in which the spike or nail is forced to travel while being driven to its seat, said nail being securely retained in place by the aforesaid distortion without requiring the use of supplemental fastenings.

A leading feature of the present improvement is to provide means for compensating for any irregularity or variableness in the walls of the socket in which the nail or spike is driven. We will suppose that the part, A, is a casting such as may be represented by a metallic railway-tie, or it may be a portion of a beam or like metal part which has been cast with a socket whose walls are integral with the aforesaid ribs. As there is likely to be some variableness in the casting of a metal piece with the aforesaid sockets or spike receiving openings, and as the cross sectional diameter of the nail or spike may not accord in all instances with the cross sectional diameter of the socket or opening, there will be afforded opportunity for lateral vibration of the nail or spike after it has been driven into the socket, unless separate pieces or shims are employed to fill in the space between the walls of the socket and the straight sides of the nail or spike which in the four-sided spike shown, are at right-angles to those sides which have been given the wavy or sinuous outline by being driven past the ribs, a. To compensate for the irregularity and variableness heretofore mentioned, and to secure the nail or spike so that all possibility of transverse vibration may be avoided, I provide on the interior of those walls of the socket which stand at right angles to the walls which are cast with the ribs, a, certain additional bosses, b, which alternate with each other and with the ribs or projections, a, and which are designed to distort the nail or spike while the same is being driven into its seat in the socket, in a plane substantially at right-angles to that in which it is bent by the ribs or projections, a. By alternating the projections, or bosses, b, and not having these projections or bosses disposed diametrically opposite each other, depressions are formed in one side of the nail or spike and corresponding projections are offset from the opposite side, and which projections fill the transverse space between the straight portions of the sides of the spike or nail and the corresponding portions of the walls adjacent thereto whereby the nail or spike is made to closely fit the socket or nail aperture transversely, and the nail or spike is thus prevented from having any lateral or transverse vibration or movement, and which movement is objectionable especially when the spike is used for securing a railroad rail to a metal tie, or where one part is designed to be so rigidly secured to another that lateral vibration would be a detriment.

From the foregoing it will be apparent that the present invention resides primarily in forming the walls of the socket or opening into which the nail or spike is driven with supplemental bosses which are designed to distort the nail or spike in such manner that filling projections are formed on the opposite walls thereof for the purpose of compensating for variableness or irregularity in casting or forming the nail or spike-receiving openings, and that the entire lateral space between one of the bosses or projections, b, and the opposite side of the wall is designed to be occupied by the spike and that consequently there can be no lateral vibration of said spike.

Having thus described my invention what I claim as new and desire to secure by Letters Patent is:—

1. A fastening of the character described, comprising a part having a socket for a driven member, said socket being rigid and having bosses alternately arranged on opposed surfaces adapted to distort said driven member laterally and form projections thereon during the driving of the same, said projections serving to fill voids in the socket member whereby lateral vibration of the driven member is avoided.

2. A fastening of the character described, comprising a part having a socket for a driven member, said socket having ribs alternately arranged on opposed surfaces adapted to be engaged by the driven member whereby a sinuous form is given the driven member during the driving thereof, said socket having, also, bosses alternately arranged on other opposed surfaces adapted to distort the driven member laterally and form projections thereon simultaneously with the driving of said member, said projections being forced into engagement with the walls of said socket to thereby fill voids in the socket and hold the driven member against lateral vibration.

In testimony whereof I affix my signature in presence of two witnesses.

AUGUSTUS FREEBORN BROWN.

Witnesses:
HARRY JOBES,
MARGARET M. HERGENROTHER.